Dec. 4, 1962   R. C. SCHROEDER   3,066,620
SUPPORT MEMBER ASSEMBLY

Filed Feb. 9, 1956   3 Sheets-Sheet 1

INVENTOR.
ROBERT C. SCHROEDER
BY
SMITH, OLSEN & KOTTS
ATTORNEYS

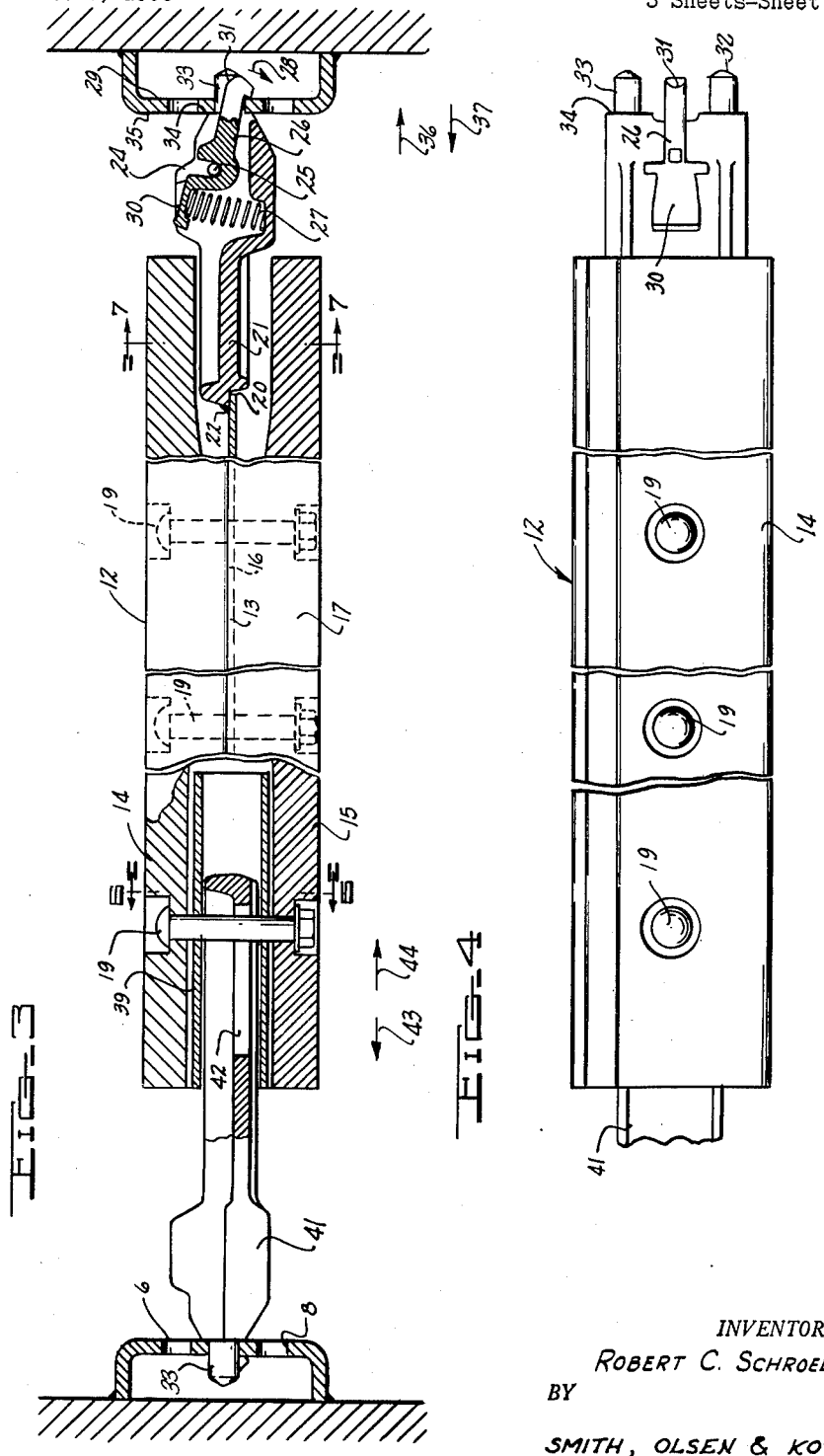

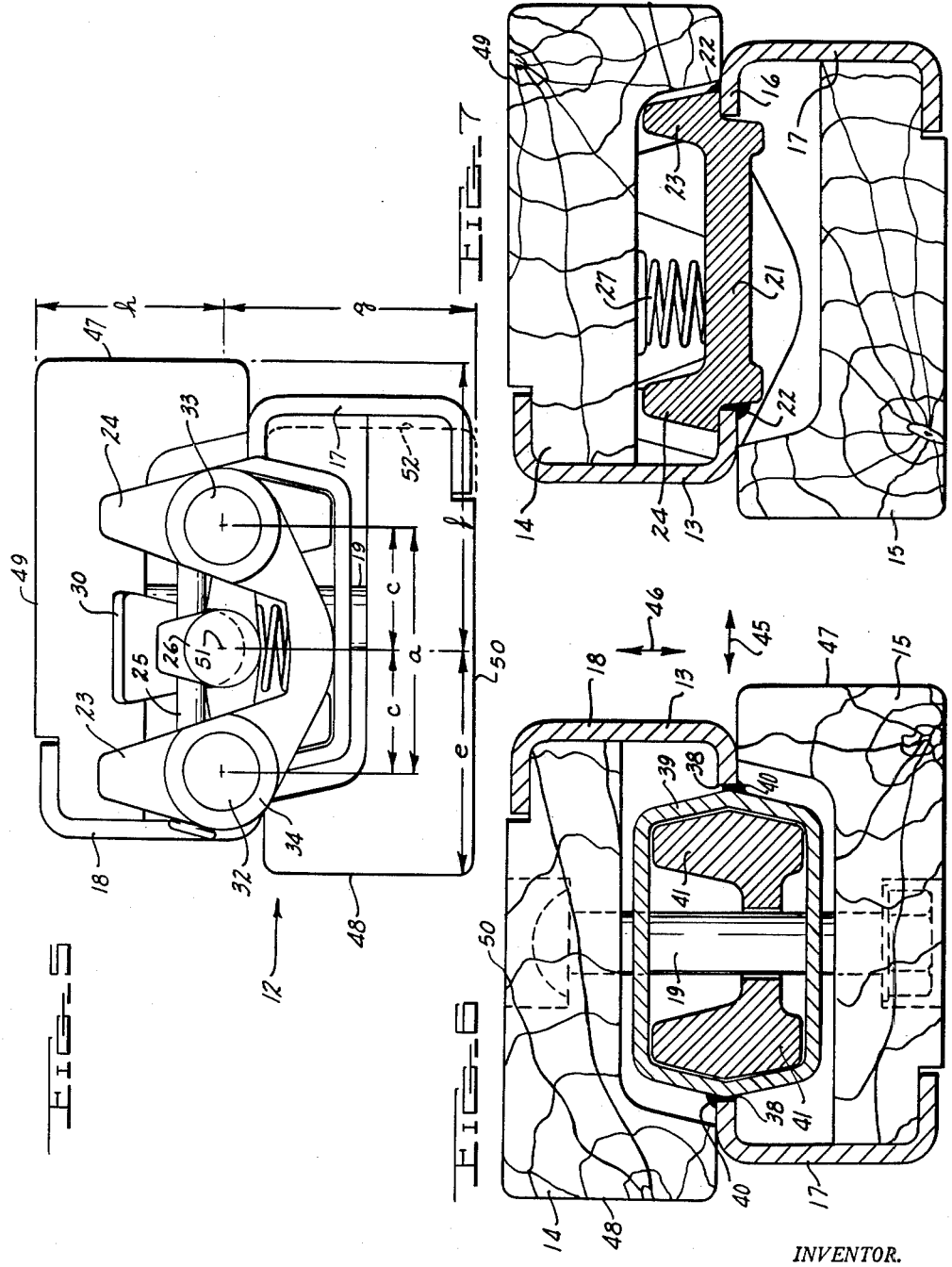

United States Patent Office 3,066,620
Patented Dec. 4, 1962

3,066,620
SUPPORT MEMBER ASSEMBLY
Robert Charles Schroeder, Dearborn, Mich., assignor of one-half to David D. Wood, Plymouth, Mich.
Filed Feb. 9, 1956, Ser. No. 564,445
2 Claims. (Cl. 105—369)

This invention relates to freight loading apparatus and particularly to apparatus of the type disclosed in United States Patent No. 2,616,375, issued on November 4, 1952 to S. N. Nampa.

In the loading of freight in railroad cars, there are usually employed a plurality of spaced supporting mechanisms along opposite side walls of the freight car. The supporting mechanisms serve to adjustably support cross members extending between opposite walls of the freight car. The cross members in turn serve to support deckboards and bulkheads. The deckboards act as shelf members in that they are positioned horizontally and are adapted to have the freight supported on their upper surfaces. The deckboards and their supporting cross members are intended primarily to support vertical loads imparted by the freight. The bulkheads are positioned in vertical locations between certain of the cross members and the freight. The bulkheads are intended primarily to support horizontal loads imparted by horizontal shifting of the freight during stop-and-go movement of the railroad car. Since the deckboards and bulkheads are supported by the cross members, it will be appreciated that the cross members must be strong enough to support the horizontal and vertical loads imparted to the deckboards and bulkheads. Recently, cross members have been devised which exhibit high strength characteristics in one direction. These cross members serve effectively to support the bulkheads. However, due to the fact that these cross members have high strength characteristics in only one direction they have not effectively been employed interchangeably as supporting members for both the bulkheads and deckboards.

Adjustment of the cross members in horizontal directions is required in order to position the bulkheads closely adjacent the freight and thereby effectively prevent horizontal shifting of the freight during stop-and-go movement of the railroad car. Generally, horizontal adjustment of the cross members has been effected by supporting them in any of a number of horizontally spaced openings in the support mechanisms adjacent the side walls of the freight car. However, in certain instances, the cross member could not be located at the desired position of horizontal adjustment due to the necessary spacing of the openings.

Adjustment of the cross members in vertical directions is required in order that the deckboards may be positioned as close as possible to the subjacent articles of freight. Such close positioning of the deckboards is necessary in order to provide a maximum utilization of the space above the deckboards for freight loading purposes. Generally, vertical adjustment of the cross members has been effected by providing a number of vertically spaced openings in the support mechanisms adjacent the car side walls. However, the range of vertical adjustment was limited by the vertical spacing between the openings; i.e. the cross member could not be vertically adjusted a lesser distance than the vertical spacing of the openings. Generally, the support mechanism for the cross member takes the form of a number of horizontally directed rail members. Each rail member is provided with a series of horizontally spaced openings, and vertical adjustments of the cross members are effected by transferring the cross member from one set of rails to another set of rails. The number of required rails was necessarily very high, sometimes as many as nineteen rails being required along each side wall of the car.

Objects of the present invention are to provide freight loading apparatus wherein:

(1) A single cross member construction can be employed to handle heavy vertical loads or heavy horizontal loads.

(2) The cross member can be adjusted horizontally through lesser distance than the horizontal spacing between adjacent support surfaces in the support mechanism by an easily effected manual adjustment, (3) The cross member can be adjusted vertically through lesser distances than the vertical spacing between adjacent support surfaces in the support mechanisms, and (4) The telescopic connection between the cross member and one of the support mechanisms can exhibit satisfactory resistance to its being pulled out of the cross member during stopping movment of the railroad car (or highway trailer).

Other objects of this invention will appear in the following description and appended claims, reference being had to the accompanying drawings forming a part of this specification wherein like reference characters designate corresponding parts in the several views.

In the drawings:

FIG. 3 is an enlarged elevational view of one of the cross members employed in the FIG. 1 apparatus, with parts broken away for illustration purposes.

FIG. 4 is a plan view of the FIG. 3 cross member.

FIG. 5 is an end elevation of the FIG. 3 cross member.

FIG. 6 is a sectional view on line 6—6 in FIG. 3.

FIG. 7 is a sectional view on line 7—7 in FIG. 3.

Figure 1:
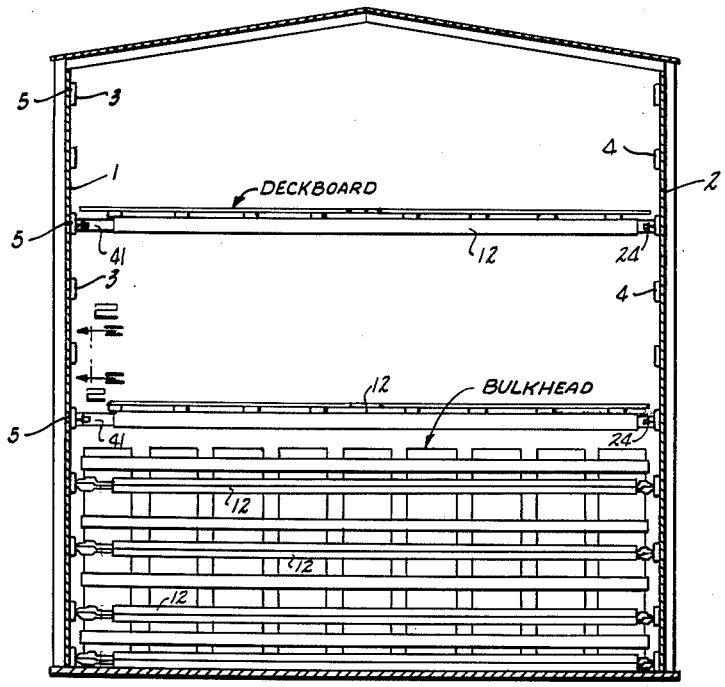
FIG. 1 is a sectional view through a railroad car in which apparatus constructed according to the instant invention is employed.
Figure 2:
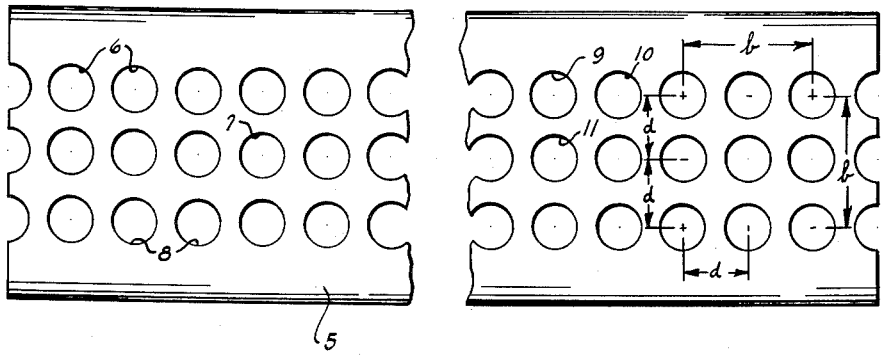
FIG. 2 is a view on line 2—2 in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is shown a railroad car having opposed side walls 1 and 2. Fixedly secured on side walls 1 and 2 are two support mechanisms 3 and 4. Each support mechanism includes a number of horizontally extending rails 5. Each rail is provided with three rows of horizontally spaced openings 6, 7 and 8. The horizontal spacing between adjacent openings in each row is the same as the spacing between adjacent rows. Thus, the spacing between openings 9 and 10 in rows 6 is the same as the spacing between opening 9 and opening 11 in row 7.

Extending between the rails 5 is a cross member 12. In practice a number of cross members would be provided, according to the number of required deckboards and bulkheads and the weight of freight in the railroad car. Each cross member includes a metal bar 13 and a pair of wooden beam members 14 and 15. Bar 13 includes a web portion 16 and oppositely directed flanges 17 and 18. The beam members are positioned against opposed faces of the web portion, and bolt members 19 extend through the bar and beam members to fixedly tie them together. The right end portion of web 16 is cut out at 20 for reception of a fitting in the form of a housing member 21. Member 21 is welded to web 16 at points 22. Housing member 21 includes spaced wall portions 23 and 24 which serve to fixedly mount a pin 25. A locking element 26 is rockably mounted on pin 25, and a compression coil spring 27 urges element 26 in the direction of arrow 28. The extreme right end portion 31 of element 26 is hook shaped so as to lockingly engage against interior surfaces 29 of rails 5. Manual pressure on portion 30 of element 26 causes hook portion 31 to be released from locking engagement with wall surfaces 29.

Housing member 21 includes two spaced pin portions 32 and 33. These pin portions 32 and 33 serve as support elements for holding cross member 12 in its illustrated position between rails 5. The size and spacing of support elements 32 and 33 with respect to the size and spacing of the openings in rails 5 are such that the locking elements can be positioned in any two horizontally aligned openings or any two vertically aligned openings. Thus, the spacing (a) between the center lines of elements 32 and 33 is the same as the spacing (b) between the openings in rails 5. Locking element 26 is positioned midway between support elements 32 and 33; i.e. the spacing (c) between locking element 26 and adjacent support elements 32 and 33 is the same as the spacing (d) between adjacent openings in rails 5. It will be noted that housing member 21 includes face portions 34 at the base of locking elements 32 and 33. Face portions 34 abut against the exterior face portions 35 of rails 5 so as to prevent longitudinal movement of cross member 12 in the direction of arrow 36. Hook portion 31 on locking element 26 prevents movement of cross member 12 in the arrow 37 direction. The free end portions of elements 26, 32 and 33 are angled with respect to the exterior face portion 35, so as to permit easy insertion of said elements into the rail openings.

The left end portion of web 16 is cut out at 38 to receive a metal sleeve 39. Sleeve 39 is welded to web portion 16 at points 40. Slidably telescoped within sleeve 39 is a fitting in the form of a housing member 41. Member 41 is provided with an elongated slot 42, and the leftmost bolt member 19 extends through slot 42 to limit slidable movement of member 41 in the directions of arrows 43 and 44. Member 41 mounts the same type locking and support elements as member 21.

The slidable telescoping movement of member 41 is necessary to compensate for inaccuracies in car side wall spacing and bulging out of the car side walls during stopping movement of the car. During such "bulging out" movement member 41 and the left most bolt 19 coact together to effectively prevent "pull out" of member 41 from cross member 12. Bolt 19 and member 41 are both of "high strength" construction; additionally bolt 19 is securely anchored in cross member 12 by the large longitudinal beam member mass. There is thus no danger of member 41 pulling out from member 12. Left most bolt 19 is located very near the left end of the cross member, and this bolt is therefore effective to prevent any separation of beam members 14 and 15 from bar 13 which might occur by reason of the different "bending" characteristics of the bar and beam member materials.

The direction taken by web portion 16 causes cross member 12 to exhibit relatively high strength characteristics in the direction of arrows 45, but relatively low strength characteristics in the direction of arrows 46. In most instances, cross member 12 will be positioned with its load-bearing faces 47 and 48 extending vertically when it is desired to employ the cross member as a bulkhead-supporting member. In such instances, the cross member will present its maximum strength in the desired horizontal direction for supporting the bulkhead. By so positioning the cross member a minimum number of cross members can be employed per given horizontal load.

In most instances when it is desired to utilize the cross member as a deckboard-supporting member, load-bearing faces 47 and 48 will be positioned in horizontal planes so that the cross member will present its maximum strength in the necessary vertical position for support of the deckboard.

Due to the spacing of the openings in rails 5 and the spacing between adjacent rows of openings, support elements 32 and 33 may be positioned in horizontally aligned openings or vertically aligned openings so as to permit maximum utilization of the cross member as a deckboard-supporting mechanism or bulkhead-supporting mechanism. It will be noted that the horizontal distance (e) from the center line 51 of locking element 26 to load-bearing face 48 is different than the horizontal distance (f) from center line 51 to load-bearing face 47. As a result, cross member 12 may be positioned in its illustrated position or it may be positioned in a position where face 48 takes the dotted line position 52. Repositioning of the cross member from the illustrated position to the dotted line position 52 may be effected by turning the cross member end for end, i.e. to a position where housing member 41 occupies the position now occupied by member 21, or by turning the cross member through one hundred eighty degrees around the axis defined by center line 51. The above-mentioned horizontal adjustment of faces 47 and 48 is less than the horizontal adjustment which would be effected by moving the cross member to a point wherein support elements 32 and 33 would be positioned in the next set of horizontal openings. This lesser adjustment permits the bulkhead to be positioned closely adjacent the freight in those instances where the horizontal adjustment provided by the openings in rails 5 would not permit the desired bulkhead positioning. When it is desired to employ member 12 as a deckboard-supporting member, member 12 may be turned from its FIG. 5 position through ninety degrees around the axis defined by center line 51. If member 12 is turned clockwise face 48 will serve as a deckboard-engaging surface, and if member 12 is turned counterclockwise face 47 will serve as a deckboard-engaging surface. The quantitative difference between spacing (e) and spacing (f) permits a vertical adjustment of member 12 through a lesser distance than that provided by the vertical spacing between adjacent rails 5.

It will be noted that the distance (e), (f), (g), and (h) are different. As a result, when it is desired to utilize member 12 as a bulkhead-supporting member a horizontal adjustment of the bulkhead may be obtained by disposing the desired one of load-bearing faces 47, 48, 49 and 50 against the bulkhead. When it is desired to utilize member 12 as a deckboard-supporting member a vertical adjustment of the deckboard may be obtained by disposing the desired one of faces 47, 48, 49 and 50 against the lower face of the deckboard. When faces 49 and 50 are employed against the deckboard or bulkhead some sacrifice in cross member strength may be obtained (due to the fact that web portion 16 does not present its thickest dimension to the load). However the adjustment may in some instances cause the bulkhead to fit tightly against the freight so as to prevent the freight from developing any momentum during stop and go movement of the car, or the adjustment may in some instances increase the usable freight storage volume. In such instances it may be desirable to employ surfaces 49 or 50 against the bulkhead or deckboard.

I claim:

1. Freight bracing apparatus comprising two parallel support mechanisms, each presenting a series of support surfaces; an elongated cross member extending between the support mechanism; said cross member including an elongated metal bar and elongated non-metallic beam members carried on opposite faces of said bar; one end portion of said bar being cut away; a longitudinally extending sleeve positioned in the cut away portion and secured to the bar; a fitting slidably carried in the sleeve and projecting longitudinally from the cross member; a longitudinal slot formed in said fitting; a series of headed securing devices extending through the beams and bar to rigidly tie said bar and beams together; one of said securing devices extending through said slot so as to act as a device for limiting relative movement between the cross member and fitting; and support elements carried by the fitting for engagement with the support surfaces on one of the support mechanisms.

2. Freight bracing apparatus comprising two parallel support mechanisms, each having a series of openings therein; an elongated cross member extending between the support mechanisms; said cross member including an elongated metal bar and elongated non-metallic beam members carried on opposite faces of said bar; one end portion of said bar being cut away; a longitudinally extending sleeve positioned in the cut away portion and secured to the bar; a fitting slidably carried in the sleeve and projecting longitudinally from the cross member; a longitudinal slot formed in said fitting; a series of headed securing devices extending through the beams and bar to rigidly tie said bar and beams together; one of said securing devices extending through said slot so as to act as a device for limiting relative movement between the cross member and fitting; a fitting carried on the other end portion of the bar; and support elements projecting from the fittings into the openings in the respective support mechanisms.

References Cited in the file of this patent
UNITED STATES PATENTS

| | | |
|---|---|---|
| 2,268,394 | Hebert | Dec. 30, 1941 |
| 2,294,795 | Moses | Sept. 1, 1942 |
| 2,354,861 | Hermann | Aug. 1, 1944 |
| 2,467,681 | McKinney | Apr. 19, 1949 |
| 2,476,362 | Fahland | July 19, 1949 |
| 2,497,683 | Nampa et al. | Feb. 14, 1950 |
| 2,514,229 | Fahland | July 4, 1950 |
| 2,556,302 | Stough | June 12, 1951 |
| 2,593,174 | O'Dell | Apr. 15, 1952 |
| 2,616,375 | Nampa | Nov. 4, 1952 |
| 2,673,530 | Stough | Mar. 30, 1954 |
| 2,679,214 | Nampa | May 25, 1954 |
| 2,747,520 | Brown et al. | May 29, 1956 |
| 2,769,404 | Dietrichson | Nov. 6, 1956 |
| 2,834,304 | Chapman et al. | May 13, 1958 |
| 2,837,039 | Schueder | June 3, 1958 |
| 2,873,695 | Tobin | Feb. 17, 1959 |